US 8,647,210 B2

(12) United States Patent
Terasaka et al.

(10) Patent No.: US 8,647,210 B2
(45) Date of Patent: Feb. 11, 2014

(54) CONSTANT VELOCITY UNIVERSAL JOINT (75) Inventors: Yoshinori Terasaka, Iwata (JP); Yasuto Watanabe, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/522,575

(22) PCT Filed: Jan. 25, 2011

(86) PCT No.: PCT/JP2011/051275
§ 371 (c)(1),
(2), (4) Date: Jul. 17, 2012

(87) PCT Pub. No.: WO2011/093257
PCT Pub. Date: Aug. 4, 2011

(65) Prior Publication Data
US 2012/0309547 A1 Dec. 6, 2012

(30) Foreign Application Priority Data
Jan. 27, 2010 (JP) .................................. 2010-015251

(51) Int. Cl.
F16D 3/84 (2006.01)

(52) U.S. Cl.
USPC .............................. 464/17; 464/173; 277/928

(58) Field of Classification Search
USPC ............ 464/17, 173–175, 906; 277/634–636, 277/926, 928
See application file for complete search history.

(56) References Cited

U.S. PATENT DOCUMENTS

| | | | | |
|---|---|---|---|---|
| 5,472,072 A | * | 12/1995 | Bumgarner | .................... 277/928 |
| 6,179,717 B1 | | 1/2001 | Schwärzler | |
| 6,820,876 B2 | * | 11/2004 | Iwano | ........................... 277/635 |
| 2008/0070706 A1 | * | 3/2008 | Compau et al. | ........... 464/175 X |

FOREIGN PATENT DOCUMENTS

| | | |
|---|---|---|
| JP | 1-100930 | 7/1989 |
| JP | 08-261324 | 10/1996 |
| JP | 11-280782 | 10/1999 |
| JP | 2004-156689 | 6/2004 |
| JP | 2005-127442 | 5/2005 |
| JP | 2006-275259 | 10/2006 |
| JP | 2006-308075 | 11/2006 |
| JP | 2008-144810 | 6/2008 |
| JP | 2009-092098 | 4/2009 |

OTHER PUBLICATIONS

International Search Report issued Mar. 8, 2011 in International (PCT) Application No. PCT/JP2011/051275.
International Preliminary Report on Patentability and Written Opinion of the International Searching Authority issued Sep. 27, 2012 in International (PCT) Application No. PCT/JP2011/051275.

* cited by examiner

*Primary Examiner* — Gregory Binda (74) *Attorney, Agent, or Firm* — Wenderoth, Lind & Ponack, L.L.P.

(57) ABSTRACT

A constant velocity universal joint includes an outer joint member in which at least one end portion is open, an inner joint member for transmitting torque together with the outer joint member through balls under a state in which angular displacement is allowed, and a boot for closing an opening portion of the outer joint member. The boot has a small diameter end portion fitted onto a shaft extending from the inner joint member, a lip portion abutting on an outer peripheral surface of the shaft, and a ventilation groove for establishing communication between an inside and an outside of the boot. The lip portion and the ventilation groove are formed in an inner peripheral surface of the small diameter end portion of the boot.

13 Claims, 6 Drawing Sheets

CONSTANT VELOCITY UNIVERSAL JOINT

TECHNICAL FIELD

The present invention relates to a constant velocity universal joint, which is used in a power transmission system for automobiles and various industrial machines, incorporated in, for example, a propeller shaft and a drive shaft of automobiles, and provided with a boot for preventing a lubricant from leaking from an inside of the joint.

BACKGROUND ART

Constant velocity universal joints to be used as, for example, means for transmitting a rotational force from an engine of an automobile to wheels at constant velocity are classified into such two types as a fixed type constant velocity universal joint and a plunging type constant velocity universal joint. The two types of constant velocity universal joints have a structure capable of transmitting rotational torque at constant velocity even when two shafts, namely, a drive shaft and a driven shaft are coupled to each other to form an operating angle.

As a constant velocity universal joint, for example, which is assembled to a propeller shaft used in automobiles, such as a 4-wheel drive (4WD) vehicle and a rear-wheel drive (FR) vehicle, there is known a plunging type constant velocity universal joint disclosed in Patent Literature 1.

In the constant velocity universal joint of this type, a lubricant such as grease is sealed in an inside of the joint, and thus a lubricating property is ensured in sliding regions in an inside of the joint when the joint is operated to rotate while forming an operating angle. Accordingly, in order to prevent a leakage of the lubricant sealed in the inside of the joint, the constant velocity universal joint has a structure in which a large diameter end portion of a boot is fitted onto one open end portion of an outer joint member, and a small diameter end portion of the boot is fastened and fixed by a boot band onto a shaft extending from an inner joint member.

The boot fitted onto the constant velocity universal joint disclosed in Patent Literature 1 has a structure in which, in addition to a portion fastened and fixed by the boot band, a lip portion abutting on an outer peripheral surface of the shaft is provided on an inner peripheral surface of the small diameter end portion. In this manner, the lip portion exerting a sealing function is provided, and thus a sealing property exerted by the boot is increased, thereby attaining secure prevention of the leakage of the lubricant sealed in the inside of the joint.

CITATION LIST

Patent Literature 1: JP 2006-308075 A

SUMMARY OF INVENTION

Technical Problems

By the way, in the constant velocity universal joint disclosed in Patent Literature 1, the lip portion provided on the small diameter end portion of the boot prevents the lubricant filled in the inside of the outer joint member from leaking to an outside of the joint, and increases the sealing property.

However, a propeller shaft, to which the constant velocity universal joint is assembled, is rotated at high speed. As a result, an internal pressure of the joint may be increased due to heat generation at the time of high-speed rotation of the propeller shaft, and a boot life may be reduced due to a deterioration caused by the heat generation.

Therefore, the present invention has been proposed in view of the above-mentioned problems, and has an object to provide a constant velocity universal joint capable of preventing a lubricant from leaking to an outside of the joint, and forestalling an increase in internal pressure of the joint and a reduction in boot life.

Solution to Problems

As technical means for achieving the above-mentioned object, the present invention provides a constant velocity universal joint, comprising: an outer joint member in which at least one end portion is open; an inner joint member for transmitting torque together with the outer joint member through torque transmission members under a state in which angular displacement is allowed; a boot for closing an opening portion of the outer joint member, the boot having an end portion fitted onto a shaft extending from the inner joint member; a lip portion abutting on an outer peripheral surface of the shaft; and a ventilation groove for establishing communication between an inside and an outside of the boot, the lip portion and the ventilation groove being formed in an inner peripheral surface of the end portion of the boot.

According to the present invention, the lip portion formed in the inner peripheral surface of the end portion of the boot abuts on the outer peripheral surface of the shaft, and thus it is possible to prevent a lubricant filled in an inside of the outer joint member from leaking to an outside of the joint, and to ensure a satisfactory sealing property. Further, the ventilation groove formed in the inner peripheral surface of the end portion of the boot establishes communication between the inside and the outside of the boot, and thus it is possible to control an increase in internal pressure of the joint due to heat generation at the time of high-speed rotation of the joint, and to forestall a reduction in boot life.

In the present invention, it is desired that the lip portion be formed in a region of the inner peripheral surface of the end portion of the boot, the region being situated on a side close to the outer joint member, and that the ventilation groove be formed in a region of the inner peripheral surface of the end portion of the boot, the region being situated on a side distant from the outer joint member. With this structure, the lip portion is provided on the side close to the outer joint member, and hence a volume of the inside of the joint filled with the lubricant is reduced. As a result, it is possible to reduce a filling amount of the lubricant, and to achieve a cost reduction. Further, even when a pumping action occurs due to axial movement of the shaft caused by sliding of the inner joint member or due to oscillation of the shaft at the time of forming an operating angle, the ventilation groove is provided at a distance from the outer joint member and axially outward of the lip portion, and hence the lip portion dams up the lubricant. As a result, it is possible to prevent the lubricant from leaking through the ventilation groove.

In the present invention, it is desired that at least one ventilation hole be provided in a region of the lip portion abutting on the shaft. With this structure, also in the lip portion, it is possible to control the increase in internal pressure of the joint, and to prevent the reduction in boot life due to deterioration caused by heat generation. Note that, when two or more ventilation holes are provided, it is possible to further control the increase in internal pressure of the joint.

In the present invention, it is desired that the ventilation groove be formed into a straight shape along an axial direction of the shaft. In this manner, when the ventilation groove having the straight shape is formed along the axial direction of the shaft, the ventilation groove can be manufactured easily.

In the present invention, it is desired that the ventilation groove be formed into a bending shape so as to comprise: an inner groove portion formed along an axial direction of the shaft; an intermediate groove portion formed continuously with the inner groove portion along a peripheral direction of the shaft; and an outer groove portion formed continuously with the intermediate groove portion along the axial direction of the shaft. With this structure, even in a case where the lubricant reaches the ventilation groove, the lubricant can be easily prevented from leaking to the outside of the joint through the ventilation groove. Note that, an inner opening portion of the inner groove portion and an outer opening portion of the outer groove portion may be formed in phases shifted by 180° in the peripheral direction of the shaft.

In the present invention, it is desired that the at least one ventilation hole of the lip portion and the inner opening portion of the ventilation groove be formed in phases different in the peripheral direction of the shaft. With this structure, it is possible to adjust the internal pressure of the joint based on an amount of phase shift between the at least one ventilation hole and the ventilation groove. Note that, the at least one ventilation hole of the lip portion and the inner opening portion of the ventilation groove may be formed in phases shifted by 180° in the peripheral direction of the shaft.

In the present invention, it is desired that a porous member be disposed to the outer opening portion of the ventilation groove. With this structure, a ventilation property exerted by the ventilation groove is ensured, and in addition, the lubricant is dammed up by the porous member even in a case where the lubricant reaches the outer opening portion of the ventilation groove. Accordingly, it is possible to securely prevent the lubricant from leaking to the outside of the joint.

In the present invention, the following structure is desired. That is, the outer joint member has a cylindrical inner peripheral surface in which straight track grooves extending axially are formed circumferentially at a plurality of positions, the inner joint member has a spherical outer peripheral surface in which straight track grooves paired with the straight track grooves of the outer joint member are formed circumferentially at a plurality of positions, and the torque transmission members comprise balls which are interposed between the straight track grooves of the outer joint member and the straight track grooves of the inner joint member under a state in which the balls are retained by a cage arranged between the cylindrical inner peripheral surface of the outer joint member and the spherical outer peripheral surface of the inner joint member. The present invention is applicable to the constant velocity universal joint having this structure, that is, a plunging type constant velocity universal joint.

Advantageous Effects of Invention

According to the present invention, the lip portion formed in the inner peripheral surface of the end portion of the boot abuts on the outer peripheral surface of the shaft, and thus it is possible to prevent the lubricant filling the inside of the outer joint member from leaking to the outside of the joint, and to ensure a satisfactory sealing property. Further, the vent groove formed in the inner peripheral surface of the end portion of the boot establishes communication between the inside and the outside of the boot, and thus it is possible to control the increase in internal pressure of the joint due to heat generation at the time of high-speed rotation of the joint, and to forestall the reduction in boot life.

As a result, it is possible to forestall a leakage of the lubricant in the inside of the joint, and to cause the ventilation hole to securely exert a heat radiating action. Therefore, it is possible to securely prevent the increase in the internal pressure of the joint and the reduction in boot life, and to provide a constant velocity universal joint having a high reliability and a long life.

BRIEF DESCRIPTION OF DRAWINGS

FIG. 1A longitudinal sectional view for illustrating an entire configuration of a constant velocity universal joint according to an embodiment of the present invention.

DETAILED DESCRIPTION OF THE INVENTION

A constant velocity universal joint according to an embodiment of the present invention is described in detail below. The following embodiment exemplifies a double offset type constant velocity universal joint as one of plunging type constant velocity universal joints, which are incorporated in a propeller shaft for use in an automobile, and have a structure capable of transmitting rotational torque at constant velocity even when two shafts, namely, a drive shaft and a driven shaft, are coupled to each other to form an operating angle.

Note that, the following embodiment describes a case where the present invention is applied to a double offset type constant velocity universal joint, but the present invention is also applicable to another plunging type constant velocity universal joints such as a cross groove type constant velocity universal joint and a tripod type constant velocity universal joint. Further, the present invention is not limited to plunging type constant velocity universal joints, but is also applicable to fixed type constant velocity universal joints such as a Rzeppa type constant velocity universal joint and an undercut free type constant velocity universal joint.

Figure 1:
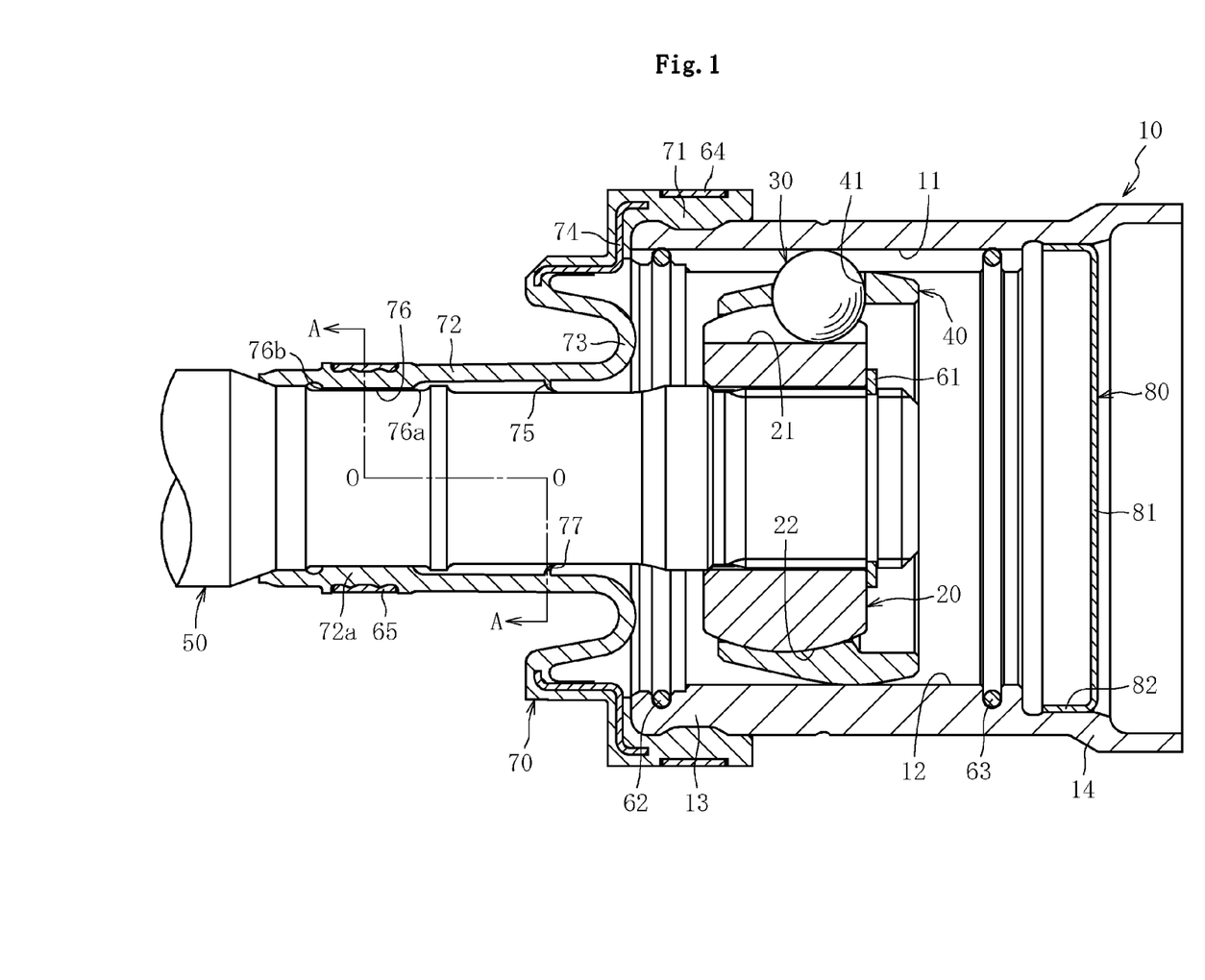
Figure 2:
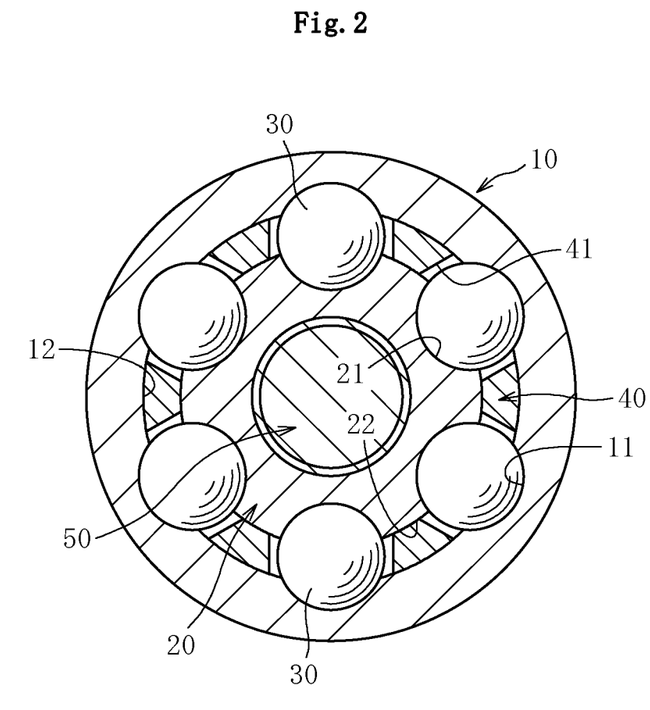
FIG. 2 A lateral sectional view for illustrating the entire configuration of the constant velocity universal joint of FIG. 1.

As main components, the constant velocity universal joint according to the embodiment of the present invention illustrated in FIGS. 1 and 2 comprises: an outer joint member 10 having a cylindrical shape with both open end portions, and having a cylindrical inner peripheral surface 12 in which straight track grooves 11 extending axially are formed circumferentially at a plurality of positions; an inner joint member 20 having a spherical outer peripheral surface 22 in which straight track grooves 21, which are paired with the track grooves 11 of the outer joint member 10 and extend axially, are formed circumferentially at a plurality of positions; a plurality of balls 30 serving as torque transmission members interposed between the track grooves 11 of the outer joint member 10 and the track grooves 21 of the inner joint member 20, for transmitting torque; and a cage 40 interposed between the cylindrical inner peripheral surface 12 of the outer joint member 10 and the spherical outer peripheral surface 22 of the inner joint member 20, for retaining the balls 30 received in pockets 41.

Note that, this embodiment exemplifies six balls 30, but the number of the balls may be set arbitrarily. Further, a shaft 50 is coupled into a shaft hole of the inner joint member 20 through spline-fitting, and is prevented from slipping off by a snap ring 61.

In order to prevent a leakage of a lubricant such as grease sealed in an inside of the outer joint member 10, the constant velocity universal joint has a structure in which a boot 70 made of a rubber or a resin is fitted onto one open end portion 13 of the outer joint member 10, whereas a metal sealing plate 80 is fitted onto the other open end portion 14 thereof. With this structure, the lubricant is sealed in a closed space which is enclosed by the outer joint member 10, the boot 70, and the sealing plate 80, and hence a lubricating property is ensured in sliding regions in an inside of the joint, namely, sliding regions formed by the outer joint member 10, the inner joint member 20, the balls 30, and the cage 40 when the shaft 50 is operated to rotate while forming the operating angle with respect to the outer joint member 10. Note that, snap rings 62, 63 are fitted onto both the open end portions 13, 14 of the outer joint member 10, respectively, the snap rings 62, 63 being provided so as to regulate sliding end positions of internal members comprising the inner joint member 20, the balls 30, and the cage 40.

The boot 70 comprises: a large diameter end portion 71 fastened and fixed by a boot band 64 on the outer peripheral surface of the one open end portion 13 of the outer joint member 10; a small diameter end portion 72 fastened and fixed by a boot band 65 on the outer peripheral surface of the shaft 50 extending from the inner joint member 20; and an intermediate portion 73 connecting the large diameter end portion 71 and the small diameter end portion 72, and having such a substantially U-shape as to be deformable when the shaft 50 forms the operating angle. A cored bar 74 is embedded between the large diameter end portion 71 and the intermediate portion 73. Further, the small diameter end portion 72 has a tubular shape extending axially from a fixed region 72a, which is fixed by the boot band 65, to the open end portion 13 of the outer joint member 10.

On the other hand, in order to prevent a leakage of the lubricant filled in the inside of the joint, the sealing plate 80 is fitted onto the other open end portion 14 of the outer joint member 10. The sealing plate 80 comprises: a disk-like plate portion 81; and a flange portion 82 which is obtained by bending an outer peripheral edge of the plate portion 81 so as to extend axially. The sealing plate 80 is fixed by press-fitting the flange portion 82 onto the inner peripheral surface of the open end portion 14 of the outer joint member 10.

In the constant velocity universal joint according to this embodiment, a lip portion 75 abutting on the outer peripheral surface of the shaft 50 and having a tongue shape in cross-section is provided on an entire periphery of a region which is situated on the inner peripheral surface of the small diameter end portion 72 of the boot 70 and is close to the open end portion 13 of the outer joint member 10. In this manner, in addition to the fixed region 72a fastened by the boot band 65, the lip portion 75 exerting a sealing function is provided, and thus a sealing property exerted by the boot 70 is increased. As a result, it is possible to securely prevent a leakage of the lubricant sealed in the inside of the joint. Note that, the lip portion 75 has a function of preventing a leakage of the lubricant as well as a ventilation property.

Further, the propeller shaft is rotated at high speed, and hence the constant velocity universal joint according to this embodiment is provided with a ventilation groove 76 in order to prevent an increase in internal pressure of the joint due to heat generation at the time of high-speed rotation of the propeller shaft, and to prevent a reduction in boot life due to a deterioration caused by the heat generation. The ventilation groove 76 is minute, which is enough not to allow a leakage of the lubricant, and is provided in the fixed region 72a of the inner peripheral surface of the small diameter end portion 72 of the boot 70, the ventilation groove 76 being fixed by the boot band 65. The ventilation groove 76 forms a surrounded ventilation path together with the outer peripheral surface of the shaft 50. With this structure, the ventilation groove 76 allows communication between the inside and the outside of the boot 70. Thus, at the time of the high-speed rotation, due to a heat radiating action of the ventilation groove 76, it is possible to forestall the increase in internal pressure of the joint and the reduction in boot life.

As described above, the lip portion 75 is provided in the region which is situated on the inner peripheral surface of the small diameter end portion 72 of the boot 70, and is close to the open end portion 13 of the outer joint member 10, and hence a volume of the inside of the joint filled with the lubricant is reduced. As a result, it is possible to reduce a filling amount of the lubricant, and to achieve a cost reduction. Further, even when a pumping action occurs due to axial movement of the shaft 50 caused by sliding of the internal members comprising the inner joint member 20, the balls 30, and the cage 40 or due to oscillation of the shaft 50 at the time of forming the operating angle, the ventilation groove 76 is provided in, of the inner peripheral surface of the small diameter end portion 72 of the boot 70, the fixed region 72a fixed by the boot band 65, and also provided axially outward of the above-mentioned lip portion 75, and hence the lip portion 75 dams up the lubricant. As a result, it is possible to prevent the lubricant from leaking through the ventilation groove 76 to the outside.

Figure 3A:
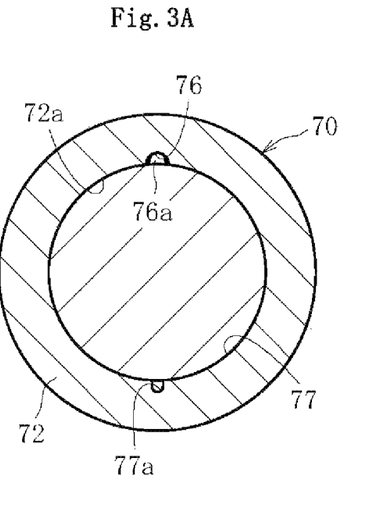
FIG. 3A A sectional view taken along the line A-O-A of FIG. 1, for illustrating an embodiment in which one ventilation groove and a semi-circular notched ventilation hole are provided.
Figure 3B:
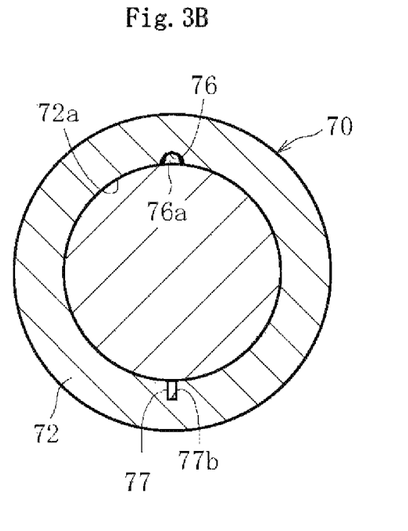
FIG. 3B A sectional view taken along the line A-O-A of FIG. 1, for illustrating an embodiment in which one ventilation groove and a rectangular notched ventilation hole are provided.
Figure 3C:
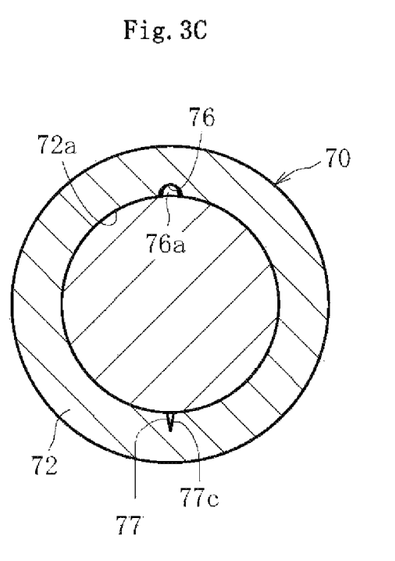
FIG. 3C A sectional view taken along the line A-O-A of FIG. 1, for illustrating an embodiment in which one ventilation groove and a V-notched ventilation hole are provided.
Figure 3D:
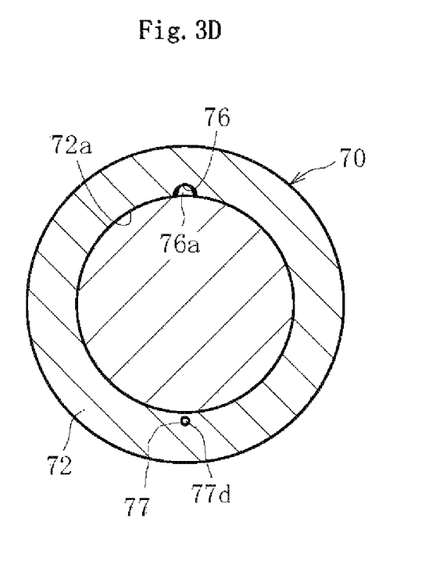
FIG. 3D A sectional view taken along the line A-O-A of FIG. 1, for illustrating an embodiment in which one ventilation groove and a penetrating ventilation hole are provided.
Figure 4A:
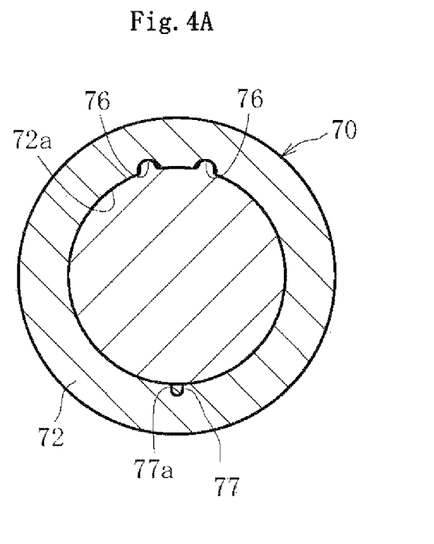
FIG. 4A A sectional view for illustrating an embodiment in which two ventilation grooves and a semi-circular notched ventilation hole are provided.
Figure 4B:
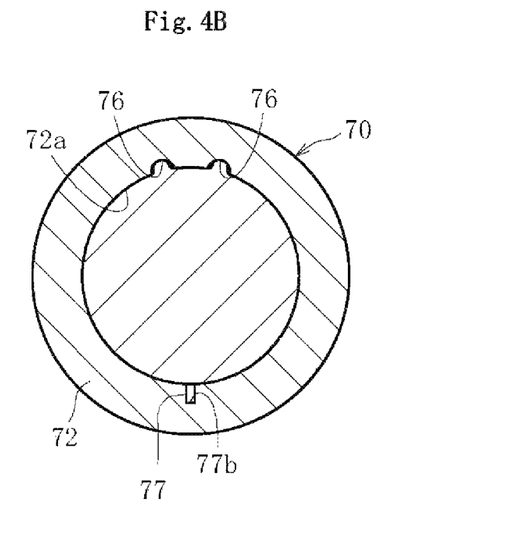
FIG. 4B A sectional view for illustrating an embodiment in which two ventilation grooves and a rectangular notched ventilation hole are provided.
Figure 4C:
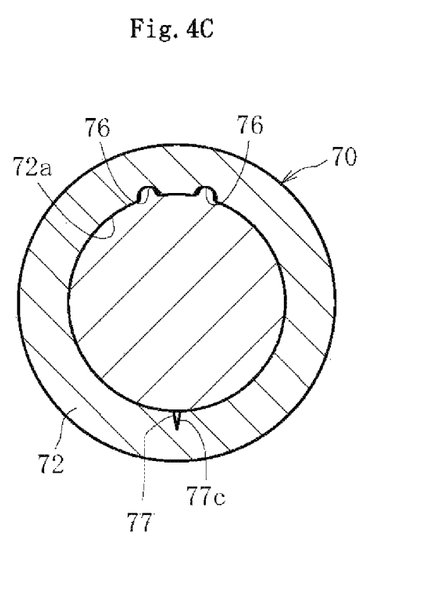
FIG. 4C A sectional view for illustrating an embodiment in which two ventilation grooves and a V-notched ventilation hole are provided.
Figure 4D:
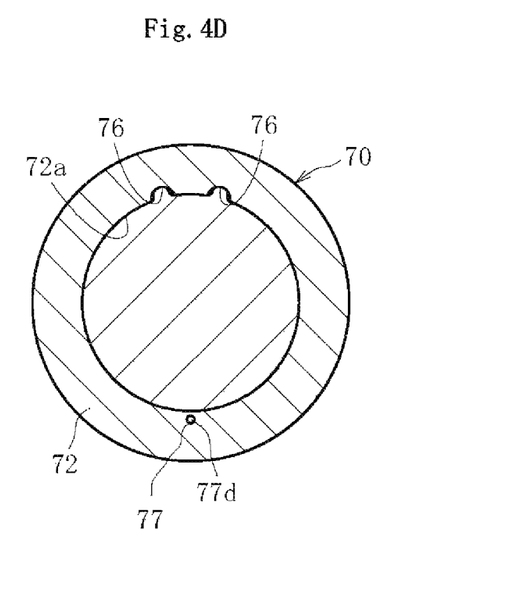
FIG. 4D A sectional view for illustrating an embodiment in which two ventilation grooves and a penetrating ventilation hole are provided.

In the constant velocity universal joint according to this embodiment, at least one ventilation hole 77 is provided in a region of the lip portion 75 abutting on the shaft. Various modes of the ventilation hole 77 can be made, and those modes are illustrated in FIGS. 3A to 3D. Note that, FIGS. 3A to 3D are sectional views taken along the line A-O-A of FIG. 1. Specifically, there can be formed a semi-circular notched ventilation hole 77a as illustrated in FIG. 3A, a rectangular notched ventilation hole 77b as illustrated in FIG. 3B, a V-notched ventilation hole 77c as illustrated in FIG. 3C, and a penetrating ventilation hole 77d as illustrated in FIG. 3D. Each of the ventilation holes 77a to 77d (hereinafter, collectively symbolized by 77) is provided in the lip portion 75 in this manner, and hence also in the lip portion 75, it is possible to control the increase in internal pressure of the joint, and to prevent the reduction in boot life due to the deterioration caused by the heat generation.

The above-mentioned embodiment modes exemplify a case where one ventilation hole 77 is provided, but two or more ventilation holes 77 having the shape illustrated in each of FIGS. 3A to 3D may be provided along a peripheral direction of the lip portion 75. In this case, it is possible to further control the increase in an internal pressure of the joint. Further, each embodiment mode exemplifies a case where one ventilation groove 76 is provided, but similarly to the case of the ventilation hole 77 of the lip portion 75, two or more ventilation grooves 76 may be provided along the peripheral direction of the boot 70. Also in this case, it is possible to further control the increase in the internal pressure of the joint. Note that, FIGS. 4A to 4D each illustrate a case where two ventilation grooves 76 are provided along with the ventilation hole 77 having the shape illustrated in each of FIGS. 3A to 3D.

The ventilation hole 77 of the lip portion 75 and an inner opening portion 76a of the ventilation groove 76 are formed in phases different in the peripheral direction of the shaft 50 (at circumferential positions). Thus, the ventilation hole 77 of the lip portion 75 and the inner opening portion 76a of the ventilation groove 76 are formed in phases different in the peripheral direction of the shaft 50, and hence it is possible to adjust the internal pressure of the joint based on an amount of phase shift between the ventilation hole 77 and the ventilation groove 76. For example, FIGS. 3A to 3D each illustrate a case where the ventilation hole 77 of the lip portion 75 and the inner opening portion 76a of the ventilation groove 76 are formed in phases shifted by 180° in the peripheral direction of the shaft 50, but an amount of phase shift may be set arbitrarily.

Figure 5:
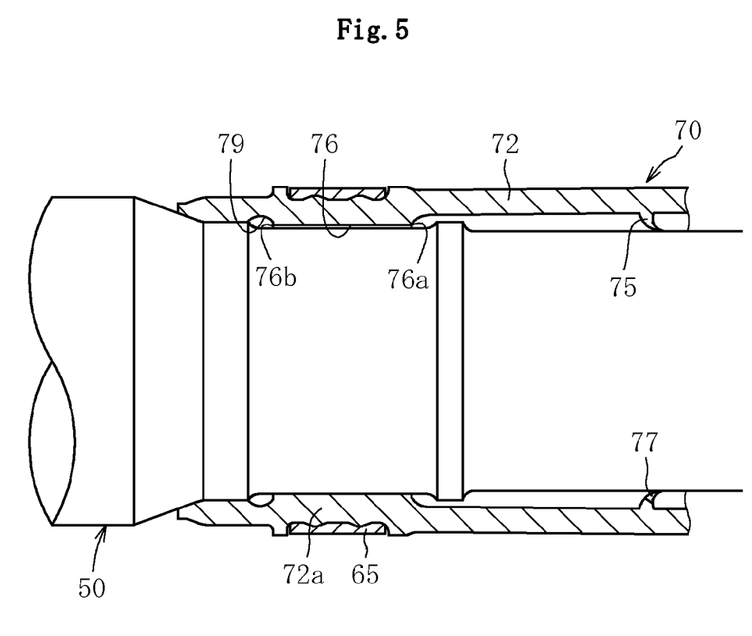
FIG. 5 A partially enlarged sectional view for illustrating an embodiment in which a straight ventilation groove is provided.

Further, as illustrated through enlargement in FIG. 1 and FIG. 5, the ventilation groove 76 is formed into a straight shape along an axial direction of the shaft 50 so as to extend from the inner opening portion 76a to an outer opening portion 76b. The ventilation groove 76 having such a straight shape is formed along the axial direction of the shaft 50, and thus the ventilation groove 76 can be manufactured easily.

Figure 6:
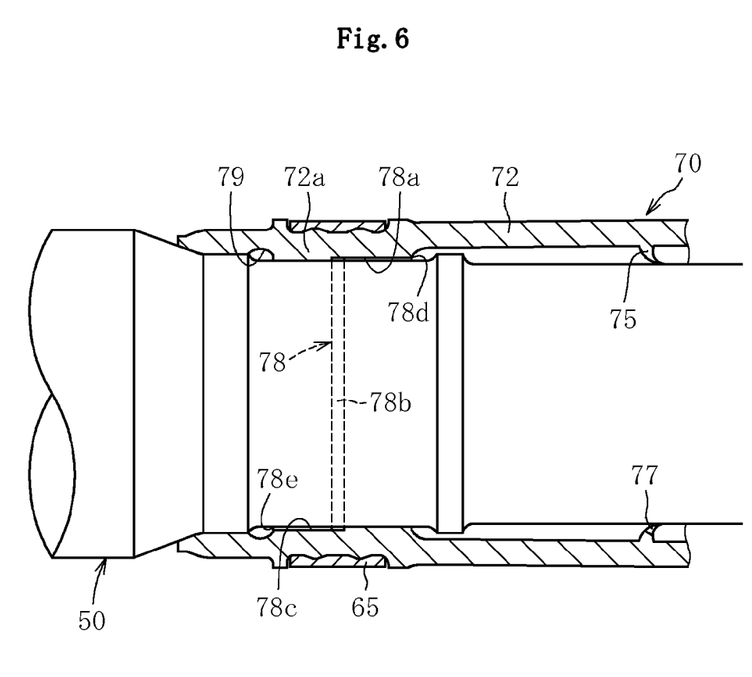
FIG. 6 A partially enlarged sectional view for illustrating an embodiment in which a bending ventilation groove is provided.

In addition, as illustrated in FIG. 6, a ventilation groove 78 may be formed into a bending shape so as to comprise: an inner groove portion 78a formed along the axial direction of the shaft 50; an intermediate groove portion 78b formed in continuous with the inner groove portion 78a along the peripheral direction of the shaft 50; and an outer groove portion 78c formed in continuous with the intermediate groove portion 78b along the axial direction of the shaft 50. With this structure, even in a case where the lubricant reaches the ventilation groove 78, the lubricant can be easily prevented from leaking to the outside of the joint through the ventilation groove 78. Note that, FIG. 6 illustrates a case where an inner opening portion 78d of the inner groove portion 78a and an outer opening portion 78e of the outer groove portion 78c are formed in phases shifted by 180° in the peripheral direction of the shaft 50, but an amount of phase shift may be set arbitrarily.

Figure 7:
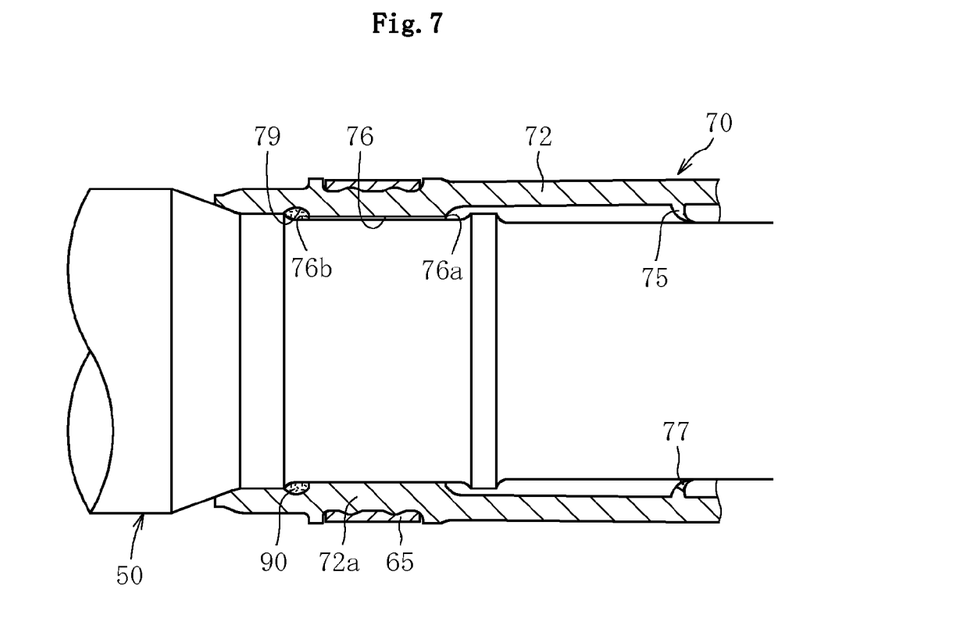
FIG. 7 A partially enlarged sectional view for illustrating an embodiment in which a porous member is provided to the straight ventilation groove.
Figure 8:
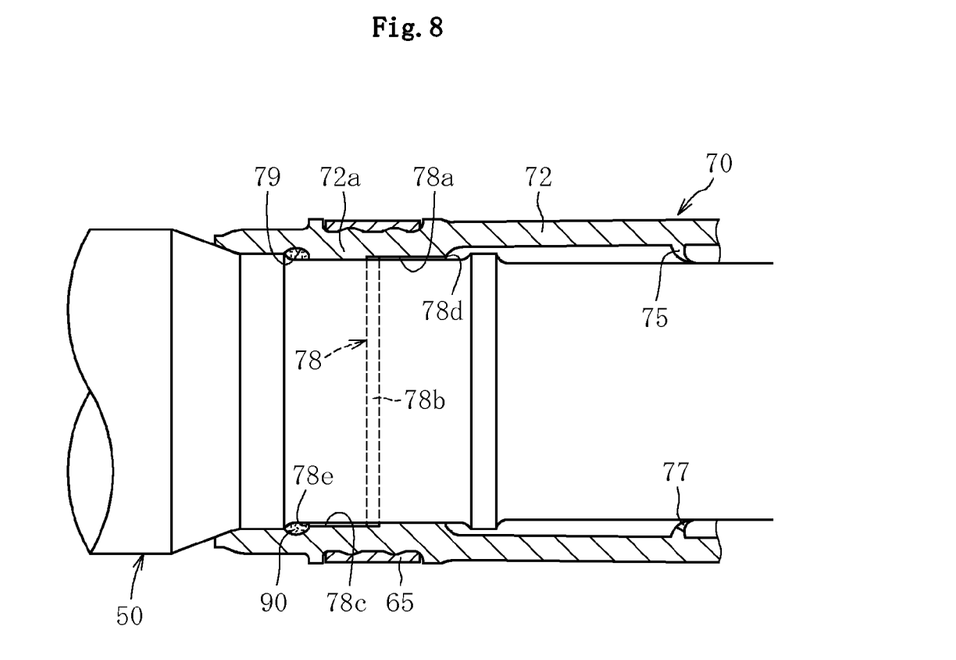
FIG. 8 A partially enlarged sectional view for illustrating an embodiment in which the porous member is provided to the bending ventilation groove.

FIG. 7 illustrates a mode in which a porous member 90 is disposed to the outer opening portion 76b of the ventilation groove 76, and FIG. 8 illustrates a mode in which the porous member 90 is disposed to the outer opening portion 78e of the ventilation groove 78. FIG. 7 illustrates a case where the porous member 90 is applied to the ventilation groove 76 having the straight shape illustrated in FIG. 5, and FIG. 8 illustrates a case where the porous member 90 is applied to the ventilation groove 78 having the bending shape illustrated in FIG. 6. Thus, the porous member 90 is disposed to the outer opening portion 76b of the ventilation groove 76 or the outer opening portion 78e of the ventilation groove 78, and hence a ventilation property exerted by the ventilation groove 76 or the ventilation groove 78 is ensured, and in addition, the lubricant is dammed up by the porous member 90 even in a case where the lubricant reaches the outer opening portion 76b of the ventilation groove 76 or the outer opening portion 78e of the ventilation groove 78. As a result, it is possible to reliably prevent the lubricant from leaking to the outside of the joint.

Note that, as the porous member 90, there are preferably used materials such as a polyurethane polymer (foamed synthetic resin), a foamed rubber, a polymeric foam, a sintered copper-based metal, and a sintered stainless-steel-based metal. The porous member 90 formed into an annular shape is fitted in a recessed groove 79 formed in the inner peripheral surface of the small diameter end portion 72 of the boot 70, and thus can be fixed therein.

The present invention is not limited to the above-mentioned embodiment. As a matter of course, various modifications can be made thereto without departing from the spirit of the present invention. The scope of the present invention is defined in claims, and encompasses equivalents described in claims and all changes within the scope of claims.

The invention claimed is:

1. A constant velocity universal joint, comprising:
an outer joint member having at least one end portion that is open;
an inner joint member for transmitting torque together with the outer joint member through torque transmission members under a state in which angular displacement is allowed; and
a boot for closing an opening portion of the outer joint member, the boot having;
   an end portion fitted onto a shaft extending from the inner joint member, the end portion including a fixed region where the end portion is fixed to the shaft with a boot band;
   a lip portion abutting on an outer peripheral surface of the shaft; and
   a ventilation groove provided at the fixed region and communicating between an inside and an outside of the boot, wherein
the lip portion has at least one ventilation hole provided therein,
the lip portion and the ventilation groove are formed at an inner peripheral surface of the end portion of the boot,
the lip portion is located at a distance away from the fixed region of the end portion, and
the lip portion is adapted to prevent leakage of lubricant.

2. A constant velocity universal joint according to claim 1, wherein:
the lip portion is formed at a region of the inner peripheral surface of the end portion of the boot, the region being located at a side of the end portion that is closer to the outer joint member; and
the ventilation groove is formed at a region of the inner peripheral surface of the end portion of the boot, the region being located at a side of the end portion that is farther away from the outer joint member.

3. A constant velocity universal joint according to claim 2, wherein the ventilation groove has a straight shape oriented in an axial direction of the shaft.

4. A constant velocity universal joint according to claim 2, wherein the ventilation groove has a bending shape and comprises:
an inner groove portion oriented in an axial direction of the shaft;
an intermediate groove portion formed continuously with the inner groove Portion and oriented in a peripheral direction of the shaft; and
an outer groove portion formed continuously with the intermediate groove portion and oriented in the axial direction of the shaft.

5. A constant velocity universal joint according to claim 4, wherein an inner opening portion of the inner groove portion and an outer opening portion of the outer groove portion are located at positions shifted by 180° in the peripheral direction of the shaft.

6. A constant velocity universal joint according to claim 1, wherein the ventilation groove has a straight shape oriented in an axial direction of the shaft.

7. A constant velocity universal joint according to claim 1, wherein the ventilation groove has a bending shape and comprises:
an inner groove portion oriented in an axial direction of the shaft;
an intermediate groove portion formed continuously with the inner groove portion and oriented in a peripheral direction of the shaft; and
an outer groove portion formed continuously with the intermediate groove portion and oriented in the axial direction of the shaft.

8. A constant velocity universal joint according to claim 7, wherein an inner opening portion of the inner groove portion and an outer opening portion of the outer groove portion are located at positions shifted by 180° in the peripheral direction of the shaft.

9. A constant velocity universal joint according to claim 1, wherein the at least one ventilation hole of the lip portion and an inner opening portion of the ventilation groove are located at different positions in a peripheral direction of the shaft.

10. A constant velocity universal joint according to claim 9, wherein the at least one ventilation hole of the lip portion and the inner opening portion of the ventilation groove are located at positions shifted by 180° in the peripheral direction of the shaft.

11. A constant velocity universal joint according to claim 1, further comprising a porous member disposed at an outer opening portion of the ventilation groove.

12. A constant velocity universal joint according to claim 1, wherein:
the outer joint member has a cylindrical inner peripheral surface in which straight track grooves extending axially are formed circumferentially at a plurality of positions;
the inner joint member has a spherical outer peripheral surface in which straight track grooves paired with the straight track grooves of the outer joint member are formed circumferentially at a plurality of positions; and
the torque transmission members comprise balls which are interposed between the straight track grooves of the outer joint member and the straight track grooves of the inner joint member under a state in which the balls are retained by a cage arranged between the cylindrical inner peripheral surface of the outer joint member and the spherical outer peripheral surface of the inner joint member.

13. A constant velocity universal joint according to claim 1, wherein the lip portion extends completely around the outer peripheral surface of the shaft and abuts a portion of the shaft completely around the outer peripheral surface of the shaft.

* * * * *